United States Patent
Copeland et al.

(10) Patent No.: US 7,401,490 B2
(45) Date of Patent: Jul. 22, 2008

(54) RAISED-CENTER AXLE AND PROCESS FOR FORMING

(75) Inventors: Greg Copeland, Massillon, OH (US); Matthew VanMeter, Cuyahoga Falls, OH (US); R. Scott Fulton, Hudson, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 214 days.

(21) Appl. No.: 11/367,849

(22) Filed: Mar. 3, 2006

(65) Prior Publication Data

US 2006/0197372 A1 Sep. 7, 2006

Related U.S. Application Data

(60) Provisional application No. 60/658,994, filed on Mar. 4, 2005.

(51) Int. Cl.
*B21D 31/00* (2006.01)
*B21D 9/04* (2006.01)

(52) U.S. Cl. .......... 72/389.1; 72/369

(58) Field of Classification Search ........ 29/446; 301/127; 72/367.1, 369, 370.4, 381, 389.1, 72/402, 701–702, 166, 169–170, 389.6, 370.19, 72/389.2, 389.7
See application file for complete search history.

(56) References Cited

U.S. PATENT DOCUMENTS

| 2,631,898 | A |   | 3/1953  | Long          |          |
|-----------|---|---|---------|---------------|----------|
| 3,667,269 | A | * | 6/1972  | Bergner       | 72/389.1 |
| 3,869,776 | A | * | 3/1975  | Moshnin et al.| 72/369   |
| 3,966,260 | A | * | 6/1976  | Braun         | 72/701   |
| 3,991,602 | A | * | 11/1976 | Harcuba et al.| 72/455   |
| 6,807,839 | B2| * | 10/2004 | Takamatu      | 72/389.1 |

FOREIGN PATENT DOCUMENTS

WO        91/17898 A   11/1991

* cited by examiner

*Primary Examiner*—Jason R Bellinger
(74) *Attorney, Agent, or Firm*—Krugliak, Wilkins, Griffiths & Dougherty Co., L.P.A.; David P. Dureska; Brent L. Moore

(57) ABSTRACT

A cold-formed, raised-center axle for a heavy-duty vehicle includes a central tube having a pair of ends, a pair of spindles attached to the central tube ends, and a wall thickness of from about 0.500 to about 0.625 inches. A hump is formed in the center portion of the tube and includes compressive residual stresses in its bottom portion when the axle is in an in-service position. A method for forming the raised-center axle includes the steps of providing a substantially straight axle, inserting the axle into a press, over-forming a hump in the axle in the direction such that camber is induced in the axle, and forming the axle in a second direction, thereby substantially removing the camber and replacing a detrimental residual stress state in the humped portion of the axle with a beneficial residual stress state.

8 Claims, 5 Drawing Sheets

RAISED-CENTER AXLE AND PROCESS FOR FORMING

CROSS-REFERENCE TO RELATED APPLICATION

This application claims the benefit of U.S. Provisional Patent Application Ser. No. 60/658,994, filed on Mar. 4, 2005.

BACKGROUND OF THE INVENTION

1. Field of the Invention

The present invention relates to the art of vehicle axles. More particularly, the invention relates to the art of raised-center axles for heavy-duty vehicles, such as tractor-trailers or semi-trailers and straight trucks, and processes for forming such axles.

2. Background Art

Heavy-duty vehicles, such as tractor-trailers or semi-trailers and straight trucks, typically include multiple axles that are longitudinally spaced along the vehicle to create ride stability. Each axle usually includes a central tube and a pair of spindles. The spindles are mounted on opposing ends of the central tube and extend outboardly therefrom. The wheels of the vehicle are rotatably mounted on the spindles, and a trailing or leading arm suspension system connects each axle to the vehicle frame. The suspension system and axle often are referred to in combination as an axle/suspension system. For the purpose of convenience, reference herein will be made only to axles, with the understanding that such axles are used in a heavy-duty vehicle axle/suspension system.

Certain types of heavy-duty vehicles, such as rear-discharge tanker trailers, often utilize an axle in which the central tube includes a center portion that is bent upwardly. Such axles are known in the art as raised-center axles, and the upwardly bent portion is referred to as a bend or a hump. When the raised-center axle is in an in-service position, the hump is above the rest of the axle or its unbent horizontally disposed portions. This is in contrast to a drop-center axle, in which the center tube of the axle includes a hump that is below the rest of the axle when the axle is in an in-service position. In the prior art, the processes associated with forming the hump for a raised-center axle have necessitated the use of a thick wall for the central tube, such as about 0.750 inches or greater.

For example, cold-forming processes of the prior art used to fabricate a raised-center axle involve a single-hit bending process, where the hit is performed by a hydraulic press. In such a process, an axle having a straight central tube is inserted into the press and a punch driven by the press hits a center portion of the tube, bending the center portion of the tube in one motion to form the hump. This single-hit process, however, produces residual stresses in the cross-section of the axle that are detrimental to the axle when it is loaded in service conditions. That is, since the hump of the raised-center axle is above the rest of the axle in an in-service position, the "overloading" of the central tube caused by the press in forming the hump produces compressive stresses in the bottom portion of the hump. However, after the punch retracts once the central tube has been bent to form the hump, there is a slight amount of spring-back of the central tube. This spring-back produces a state of residual tensile stress in the bottom portion of the hump of the axle, which combines with load forces experienced by the axle when it is in service that tend to flex the hump and to create additional tensile stresses in the bottom portion of the axle hump. This combination of load-induced tensile stresses and residual tensile stresses in the axle at the bottom portion of the hump has the potential to produce a premature failure of the axle.

The effect of the state of residual tensile stress in the bottom portion of the hump of the raised-center axle is in contrast to the effect of the same state of residual stress in a drop-center axle. More particularly, a drop-center axle includes the same state of residual tensile stress in the same location as the raised-center axle, however the inverted orientation of the drop-center axle causes in-service loading conditions to produce compressive stresses that counterbalance the residual tensile stresses. This contrast substantiates the principle that a one-time overload to form an axle tube produces residual stresses that are favorable to subsequent loading in the same direction, while those same residual stresses are detrimental to subsequent loading in the opposite direction.

To compensate for the residual stresses that contribute to the potential premature yielding of raised-center axles that are cold-formed according to prior-art processes, the axles include large wall thicknesses, on the order of about 0.750 inches. Even with such large wall thicknesses, however, these prior-art raised-center axles are still potentially susceptible to premature structural failure. Post forming treatment processes have been tried in an attempt to reduce such undesirable residual stresses in the prior art raised-center axles, such as by shot peening or needle peening of the axle. However, the addition of such post-forming treatment processes undesirably increases the time and expense to produce a raised-center axle. In addition, surface treatments such as those noted above do not significantly improve the static strength of the axle, which is diminished severely by residual stresses from cold-forming.

Other prior-art raised-center axle forming processes include hot forming of the hump. Hot forming reduces residual stresses, but requires a large wall thickness to maintain the ability to bend the axle central tube to form the hump while maintaining structural integrity. Thus, an axle tube wall thickness of about 0.750 inches is again required. Hot forming also is typically more expensive than cold forming, due in part to the additional time, energy and equipment associated with heating the axle for forming. As a result, raised-center axles that are hot formed tend to be more expensive than those that are cold formed, and still require increased wall thicknesses, which introduce unnecessary weight to the axle.

The large wall thicknesses needed for raised-center axles formed according to prior art processes are undesirable, as large wall thicknesses increase the amount and thus the cost of the raw material needed for the axle. In addition, a large wall thickness increases the weight of the axle, which undesirably contributes to decreased payload for the vehicle on which the axle is incorporated.

Thus, a need exists in the art for a raised-center axle that overcomes the problems of the prior art by being economically formed, while reducing undesirable residual stresses and wall thickness, and maintaining or improving physical properties exhibited by prior art raised-center axles. A need also exists in the art for a process to economically form such a raised-center axle. The present invention provides such a raised-center axle and method for forming the same.

BRIEF SUMMARY OF THE INVENTION

An objective of the present invention is to provide a raised-center axle that replaces a detrimental residual stress state in the humped portion of the axle with a beneficial residual stress state.

Another objective of the present invention is to provide a raised-center axle that has a reduced wall thickness.

Yet another objective of the present invention is to provide a raised-center axle that exhibits physical properties that are comparable to or better than those of prior art raised-center axles.

Still another objective of the present invention is to provide a method for economically forming a raised-center axle having beneficial residual stresses and a reduced wall thickness, yet comparable or improved physical properties as compared to prior art raised-center axles.

These objectives and others are obtained by the cold-formed, raised-center axle for a heavy-duty vehicle of the present invention, the general nature of which may be stated as including a central tube having a pair of ends and a wall thickness of from about 0.500 to about 0.625 inches. Each one of a pair of spindles is attached to a respective one of the central tube ends. A hump is cold-formed in the central tube between the ends and the hump extends generally upwardly when the axle is in an in-service position. The bottom portion of the hump in the in-service position exhibits compressive residual stresses.

These objectives and others are also obtained by the method for cold-forming a raised-center axle of a heavy-duty vehicle of the present invention, which includes the steps of providing a substantially straight axle and inserting the axle into a press. A hump is over-formed in a first direction with the press, producing a camber in the axle. Subsequently, the axle is formed in a second direction with the press to substantially remove the camber while simultaneously replacing detrimental residual stresses in the humped portion of the axle in an in-service position with beneficial residual stresses.

BRIEF DESCRIPTION OF THE SEVERAL VIEWS OF THE DRAWINGS

The preferred embodiment of the invention, illustrative of the best mode in which applicants have contemplated applying the principles of the invention, is set forth in the following description and is shown in the drawings, and is particularly and distinctly pointed out and set forth in the appended claims.

Similar numerals refer to similar parts throughout the drawings.

DETAILED DESCRIPTION OF THE INVENTION

Figure 1:
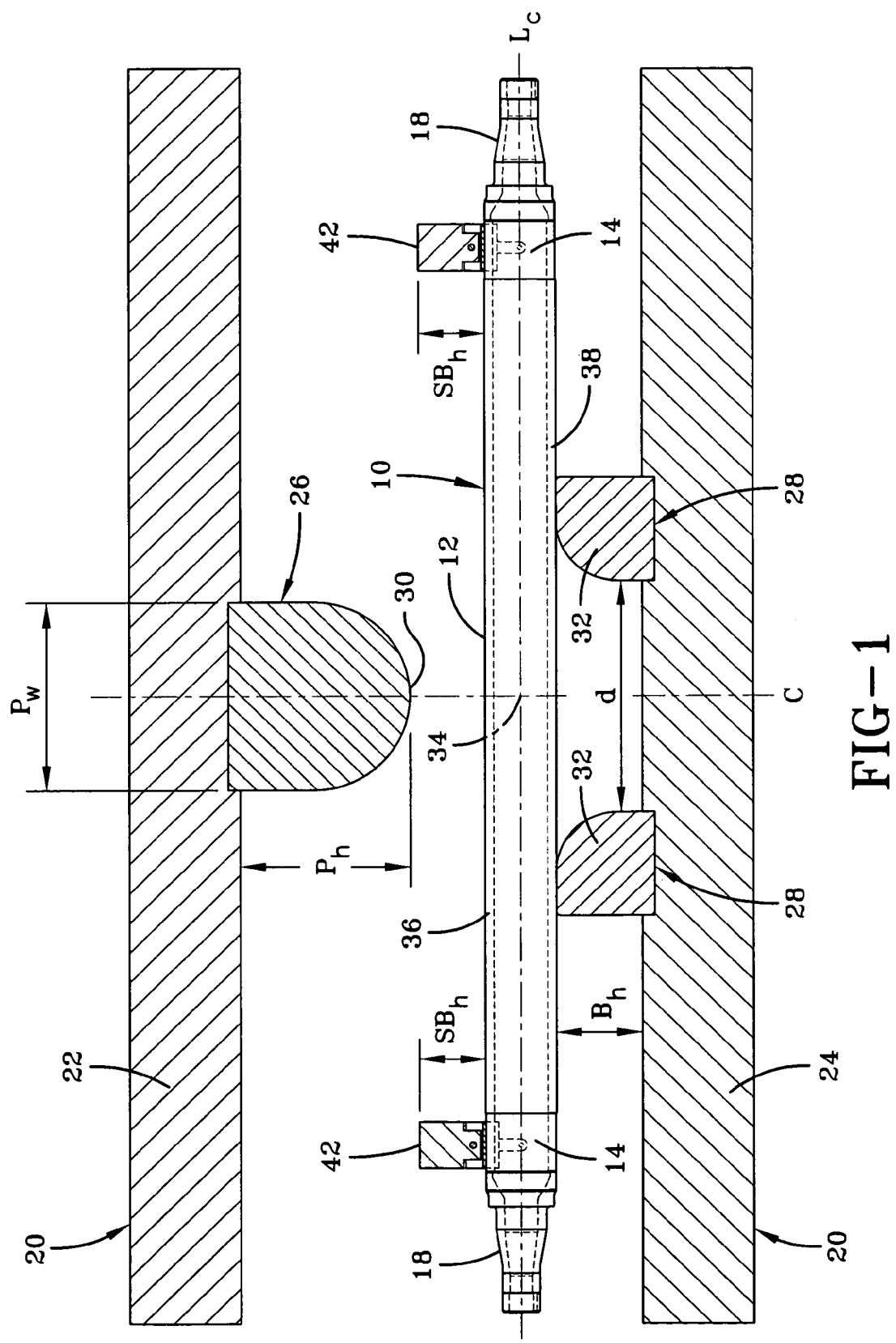
FIG. 1 is a schematic front elevational view of an axle positioned in a press prior to raised-center forming, with selected portions of the press represented by hatched lines and hidden structure of the axle represented by broken lines.
Figure 2:
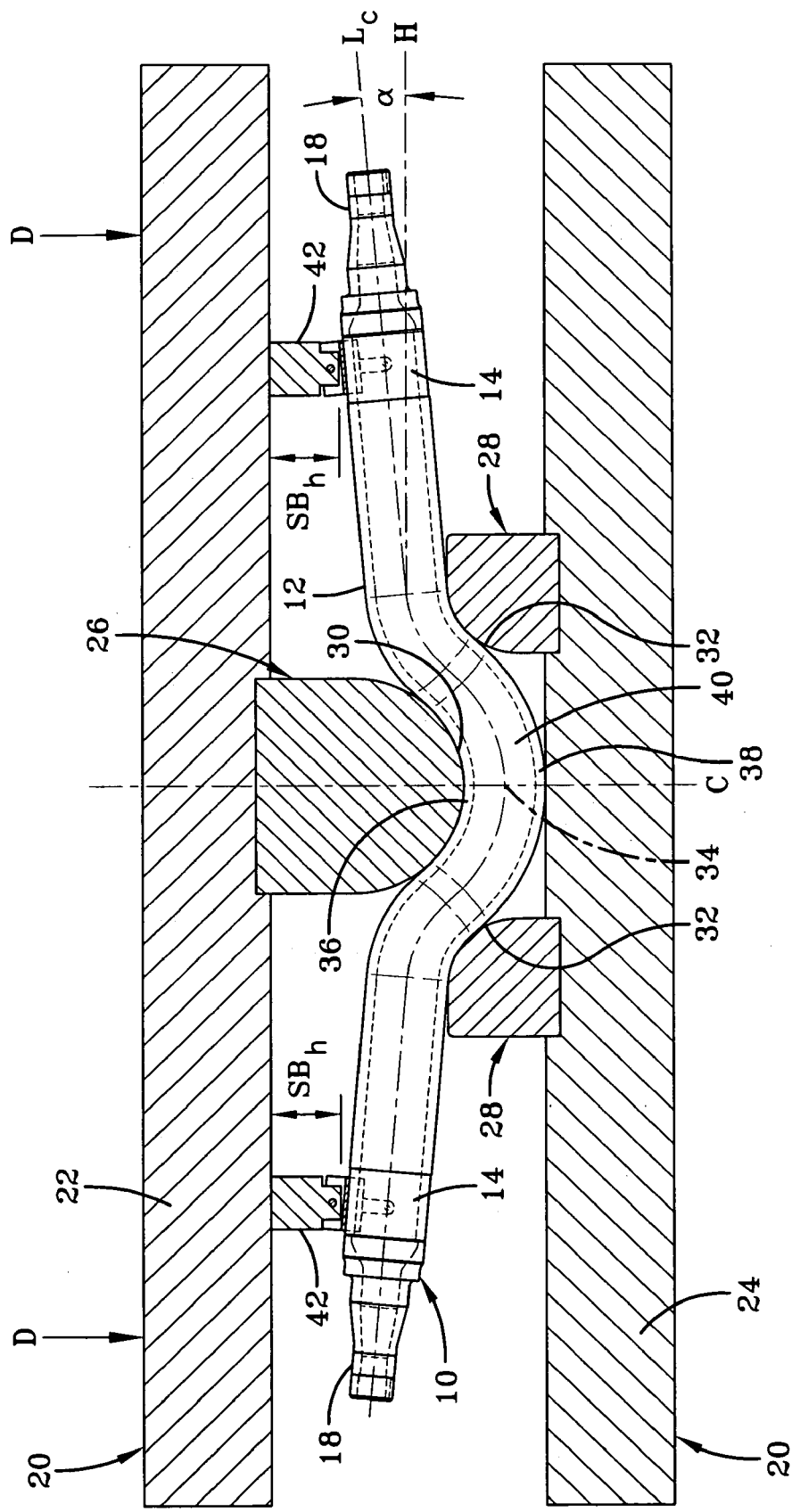
FIG. 2 is a view similar to FIG. 1, but showing the position of the press and altered configuration of the axle after a first step of the raised-center forming operation of the present invention has been completed.
Figure 3:
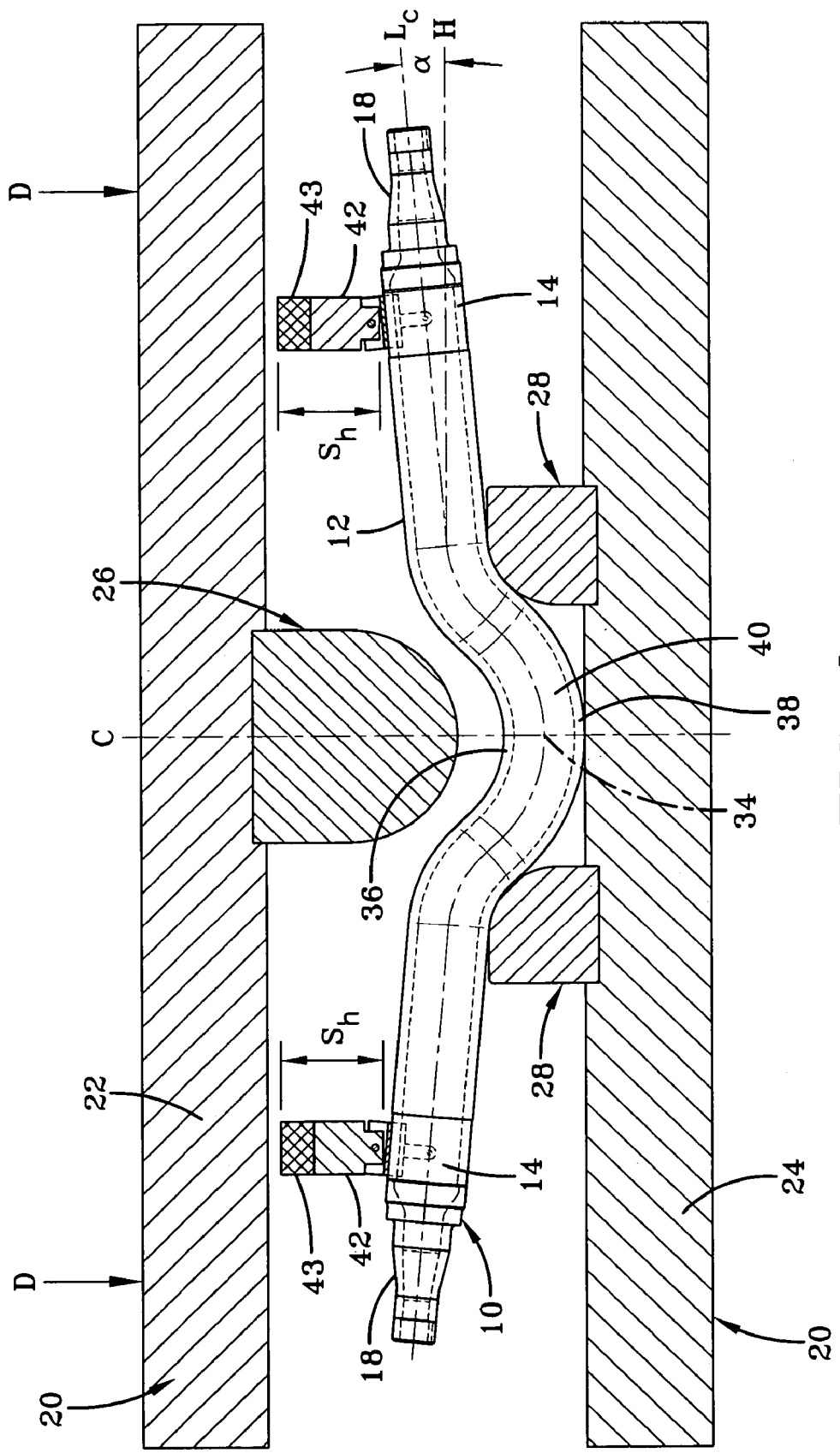
FIG. 3 is a view similar to FIGS. 1 and 2, but showing the position of the press, shims, and shoulder blocks in preparation for a second step of the raised-center forming operation of the present invention.

Turning now to the drawings, wherein the illustrations are provided to show a preferred embodiment of the invention and not to limit the same, an axle to be formed into a raised-center axle is shown in FIGS. 1-3 and is indicated generally at 10. With particular reference now to FIG. 1, axle 10 includes a central tube 12 that has a pair of ends 14. Each one of a pair of spindles 18 is mounted to a respective one of ends 14 of central tube 12.

For forming according to the method of the present invention, axle 10 is placed in a press 20, which includes an upper platen 22 and a lower platen 24. A punch 26 is secured to upper platen 22 and extends downwardly therefrom, preferably at the center of the platen, as indicated by centerline C. A pair of lower shoulder blocks 28 are secured to lower platen 24 and extend upwardly therefrom, and the blocks are spaced apart from one another at a distance d with each one of the blocks being equidistant from centerline C. Punch 26 includes a height Ph and a width Pw that cooperate with a height Bh of lower shoulder blocks 28 and distance d to produce desired bend dimensions in central tube 12 for the hump to be formed. Punch 26 includes a curved lower surface 30 and each lower shoulder block 28 includes a radiused upper surface 32 that provide a desired curvature in the hump to be formed. Optionally, lower shoulder blocks 28 may each include an upper channel (not shown) that receives central tube 12, thereby allowing the blocks to hold axle 10 in place. Each one of a pair of upper shoulder blocks 42 is secured to a respective one of ends 14 of central tube 12 adjacent each spindle 18 by a means well known in the art, with each block being equidistant from the centerline C and having a height SBh to produce the desired bend dimensions in the central tube 12, and in particular to control overbend of the axle during the first forming step, as will be described in detail below.

With continuing reference to FIG. 1, a transverse center point 34 of axle 10 is aligned with vertical centerline C of press 20 and the axle is turned or rotated radially to orient it and ensure that the hump is formed in the desired direction. More particularly, certain features and components (not shown) for mounting axle 10 preferably are already formed in or attached to the axle, so the axle must be oriented according to its in-service position. Press 20 is shown with upper platen 22 as the moving platen, and lower platen 24 as the stationary platen for the purpose of convenience. In service, axle 10 will include a bottom portion 36 and a top portion 38 (see FIGS. 2-5). Therefore, during forming, the hump will be formed in a downward direction, resulting in bottom portion 36 of axle 10 being oriented upwardly in press 20, and top portion 38 being oriented downwardly. Alternatively, other types of presses 20 may be used. For example, press 20 may include a lower platen that is the moving platen, while an upper platen is stationary. In such a case, the orientations of top and bottom portions 36, 38 of axle 10 are reversed accordingly. It is important to note that, when axle 10 is placed in press 20, a longitudinal centerline Lc of spindles 18 is generally horizontal.

Turning now to FIG. 2, upper platen 22 of press 20 moves downwardly as indicated by arrows D to over-form axle 10. That is, the movement of upper platen 22 causes punch 26 to strike central tube 12, with sufficient force to form a hump 40 and over-bending the central tube, as shown by angle $\alpha$. Angle $\alpha$ is known in the art as camber, which is the angle of spindle longitudinal centerline Lc relative to horizontal H. Upper shoulder blocks 42 contact upper platen 22 during this first step in the forming process, thus limiting angle $\alpha$ and controlling the overbend of the central tube.

In raised-center axle forming processes of the prior art, the goal has been to achieve a zero-degree camber $\alpha$ upon a single forming operation in order to allow the wheels (not shown) that will be mounted on spindles 18 to ride evenly during vehicle operation. For drop-center axles, this single forming operation produces desirable residual stresses because such stresses are favorable to subsequent loading in the same direction during operation of the vehicle, so only one hit is performed, with resulting camber α of about zero degrees. In the raised-center axle forming process of the present invention, however, the first forming operation is an over-forming operation, yielding some amount of positive camber α, such as in a range of about 0.250 to about 1.000 degrees, and preferably in a range of about 0.375 to about 0.500 degrees. Once upper platen 22 and punch 26 are retracted after the first forming operation, axle 10 experiences some spring-back, creating residual tensile stress in bottom portion 36 of hump 40.

Figure 4:
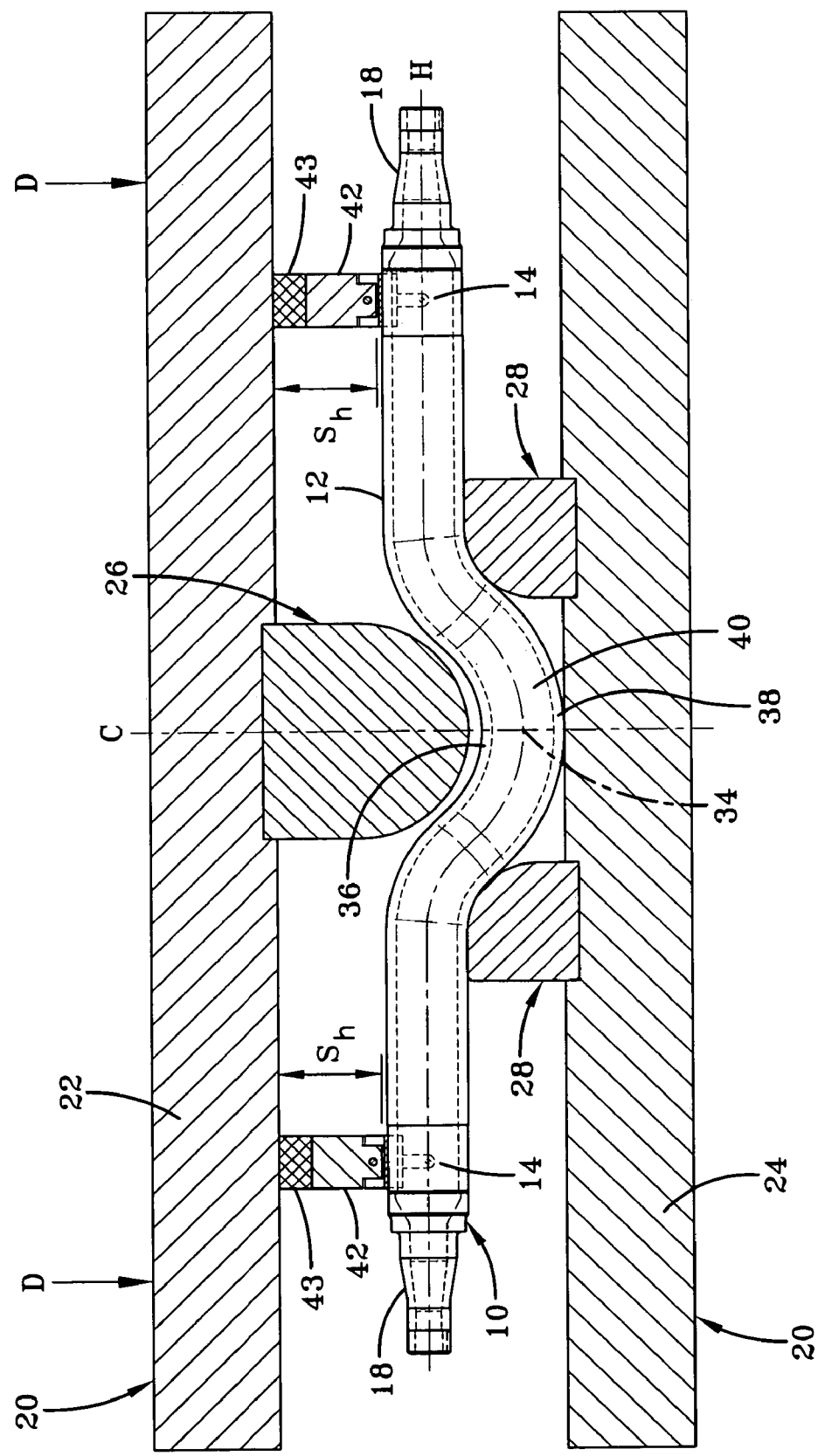
FIG. 4 is a view similar to FIGS. 1-3, but showing the position of the press and altered configuration of the axle during the second step of the raised-center forming operation of the present invention.

With reference now to FIG. 3, preferably without removing axle 10 from press 20, each one of a pair of shims 43 is attached to the top of a respective one of upper shoulder blocks 42. Shims 43 and upper shoulder blocks 42, in conjunction with one another, have a height Sh that enables upper platen 22 of press 20 to contact the upper surface of the shims without punch 26 contacting axle 10 upon re-activation of press 20. Upper platen 22 moves as indicated by arrows D and strikes shims 43 with sufficient force to bend central tube ends 14 downwardly, as shown in FIG. 4, while shoulder blocks 28 hold central tube 12. In this manner, a second forming operation bends central tube ends 14 about shoulder blocks 28 toward horizontal H to reduce camber α to approximately zero degrees, plus or minus a tolerance small enough to ensure successful operation in service and to minimize tire wear and the like. In the second forming operation, upper platen 22 moves far enough to cause axle 10 to yield sufficiently for spindles 18 to be disposed parallel to horizontal H after spring-back of the axle when the upper platen retracts.

This second forming operation, which is a post-forming operation after the initial formation of hump 40, without contact by punch 26, causes a yielding of the axle 10 that reverses the bending moment in the center portion of the axle. This yielding in the center portion of axle 10 induces residual stresses that essentially reverse the residual tensile stresses in bottom portion 36 of hump 40 caused by the first forming operation (FIG. 2), thereby creating desirable compressive residual stresses in the bottom portion of the hump that are favorable to in-service loading for a raised-center axle. This favorable residual stress state results in improved static strength and improved fatigue life, as will be described in greater detail below.

Figure 5:
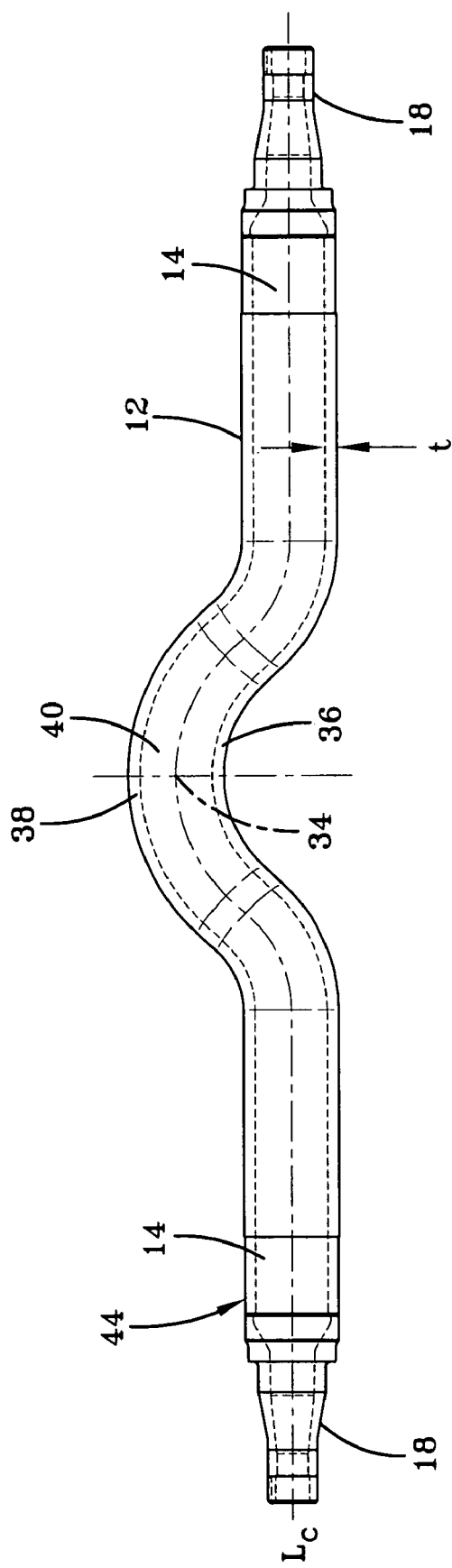
FIG. 5 is a front elevational view of the raised-center axle of the present invention in an in-service orientation, with hidden structure represented by broken lines.

Turning now to FIG. 5, formed raised-center axle of the present invention is indicated generally at 44 and is shown in an operational, or in-service, position. Raised-center axle 44 includes physical properties and characteristics that are improved over prior-art raised-center axles. For example, raised-center axle 44 includes a wall thickness t in a range of from about 0.500 inches to about 0.625 inches, as compared to prior-art raised-center axles, which have a wall thickness of about 0.750 inches. In addition, even with thinner wall thickness t, raised-center axle 44 experiences a longer life and improved performance over prior-art axles at typical anticipated load ratings, as the following test results demonstrate. Each test was conducted using a load rating of about 23,000 pounds, which is a typical load rating for a standard-duty raised center axle, and is the intended load rating for raised-center axle 44 of the present invention.

A vertical beaming fatigue test was conducted, in which a sample raised-center axle 44 of the present invention, the sample having wall thickness t of about 0.625 inches, was cyclically loaded to determine the number of loading cycles that would cause the axle to crack through its exterior tube wall. More particularly, raised-center axle 44 and a typical prior-art raised-center axle, the prior-art axle having a wall thickness of 0.750 inches, were each cyclically loaded at spindles 18 with up to about 23,000 pounds per spindle, or about 46,000 total pounds, until each axle cracked through its exterior tube wall. Raised-center axle 44 of the present invention cracked through its exterior tube wall at 104,200 cycles on average, lasting an average of 40 percent longer than the most durable representative sample of the prior art raised center axle which cracked through its exterior tube wall at approximately 74,000 cycles, demonstrating a marked improvement over the prior art despite having a reduced wall thickness. It is worth noting that the most durable representative sample of the raised-center axle 44 of the present invention cracked through its exterior tube wall at about 116,000 cycles.

A vertical beaming static load test was also performed, in which a sample raised-center axle 44 of the present invention, the sample having wall thickness t of about 0.625 inches, was loaded with increasing weight by loading each spindle 18 to simulate in-service loading characteristics, until the axle yielded, thereby measuring the strength of the axle. For comparison, a straight axle having a load rating of 23,000 pounds, which is typically expected by those skilled in the art to be stronger than a raised-center axle, was loaded under the same conditions as the raised-center axle 44 of the present invention. Raised-center axle 44 of the present invention showed no permanent set at a load of about 69,000 total pounds, or about 34,500 pounds per spindle 18, and minor but conclusive set at a load of about 80,500 total pounds, or about 40,250 pounds per spindle. The straight axle showed no permanent set at a load of about 46,000 total pounds, or about 23,000 pounds per spindle, inconclusive or very minor set at a load of about 57,500 total pounds, or about 28,750 pounds per spindle, and minor but conclusive set at a load of about 69,000 total pounds, or about 34,500 pounds per spindle. Comparing the loads at the point of minor but conclusive set, which is indicative of yield, raised-center axle 44 of the present invention unexpectedly is approximately 16 percent stronger than the straight axle rated at 23,000 pounds.

Thus, raised-center axle 44 of the present invention exhibits longer life and improved strength when compared to prior-art axles. Raised-center axle 44 is cold-formed by two forming processes, or hits, in two different directions, thereby imparting favorable residual stresses to the thickness t that is less than that of prior-art raised-center axles, which leads to raw material savings and weight savings.

In this manner, raised-center axle 44 is economically formed and results in improved characteristics and performance over raised-center axles of the prior art. It is to be noted that certain steps, the order of those steps, and the machinery or tools used to carry out such steps, have been described herein by way of example, but are not intended to limit the scope of the invention. For example, the order and the number of steps, and/or the type of equipment used to accomplish those steps, may be altered or adjusted without affecting the overall concept of the invention.

Accordingly, the raised-center axle and method for forming the same of the present invention is simplified, provides an effective, safe, inexpensive, and efficient structure and method which achieves all the enumerated objectives, provides for eliminating difficulties encountered with prior-art raised-center axles and processes for forming the same, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved raised-center axle is constructed, arranged and used, the characteristics of the construction and arrangement, and the advantageous, new and useful results obtained; the new and useful steps, structures, devices, elements, arrangements, parts and combinations, are set forth in the appended claims.

What is claimed is:

1. A method for cold-forming a raised-center axle of a heavy-duty vehicle, said method comprising the steps of:
   providing a substantially straight axle;
   inserting said substantially straight axle into a press;
   over-forming a hump in said axle in a first direction with said press, to produce a camber in the axle; and
   forming the axle in a second direction with the press to substantially remove said camber in the axle, whereby compressive residual stresses are induced in a bottom of said hump, said hump extending generally upwardly when in an in-service position.

2. The method for cold-forming a raised-center axle of a heavy-duty vehicle of claim 1, wherein said camber is a positive camber in a range of from about 0.250 degrees to about 1.000 degrees.

3. The method for cold-forming a raised-center axle of a heavy-duty vehicle of claim 1, wherein said step of over-forming a hump in said axle in a first direction induces tensile residual stresses in a bottom of said hump of said axle in an in-service position after spring-back of the axle, and said step of forming said axle in a second direction induces compressive residual stresses in said bottom of said hump after spring-back of the axle.

4. The method for cold-forming a raised-center axle of a heavy-duty vehicle of claim 1, wherein the direction of forming in said step of over-forming a hump in said axle in a first direction is generally opposite the direction of forming in said step of forming said axle in a second direction.

5. The method for cold-forming a raised-center axle of a heavy-duty vehicle of claim 1, wherein said step of over-forming a hump in said axle includes holding said axle in said press with shoulder blocks and hitting the axle with a punch operatively connected to a moving platen of said press.

6. A raised-center axle for a heavy-duty vehicle formed according to the process of claim 1.

7. The raised-center axle for a heavy-duty vehicle of claim 6, wherein said axle includes a wall thickness of from about 0.500 to about 0.625 inches.

8. The method for cold-forming a raised-center axle of a heavy-duty vehicle of claim 1, wherein said step of forming said axle in a second direction includes hitting a pair of upper shoulder blocks and shims that are in contact with said axle.

* * * * *